United States Patent [19]
Benuzzi

[11] Patent Number: 4,772,162
[45] Date of Patent: Sep. 20, 1988

[54] GRIPPING APPARATUS

[75] Inventor: Piergiorgio Benuzzi, Bologna, Italy

[73] Assignee: Giben Impianti S.p.A., Pianoro, Italy

[21] Appl. No.: 11,087

[22] Filed: Feb. 5, 1987

[51] Int. Cl.[4] .................. B23C 9/00; B23Q 3/06
[52] U.S. Cl. ..................... 409/219; 269/235; 269/254 R
[58] Field of Search ............ 409/219, 225, 227; 408/69; 269/94, 134, 135, 138, 153, 235, 254 R, 905, 265

[56] References Cited

U.S. PATENT DOCUMENTS

| 546,192 | 9/1895 | Schnauder | 409/219 X |
| 3,175,353 | 3/1965 | Coffey | 269/254 R |
| 3,176,973 | 4/1965 | Daniels | 409/219 X |

FOREIGN PATENT DOCUMENTS 3327062  9/1984  Fed. Rep. of Germany ...... 269/235

Primary Examiner—William R. Briggs
Attorney, Agent, or Firm—Pollock, Vande Sande & Priddy

[57] ABSTRACT

Apparatus for gripping panels or stacks of panels during cutting thereof, comprising a series of identical mechanical grippers grouped side by side in battery formation. The grippers are each formed by two vertically superposed levers (1, 6) acting along a vertical plane, interconnected at a common fulcrum point (7) and urged in the closing direction by a spring (9) and in the opening direction by a centralized mechanical system comprising a shaft (10) which cooperates transversely with the upper levers (6), which is supported by the same structure as the grippers and which may be selectively raised and lowered by one central motion unit (13).

4 Claims, 2 Drawing Sheets

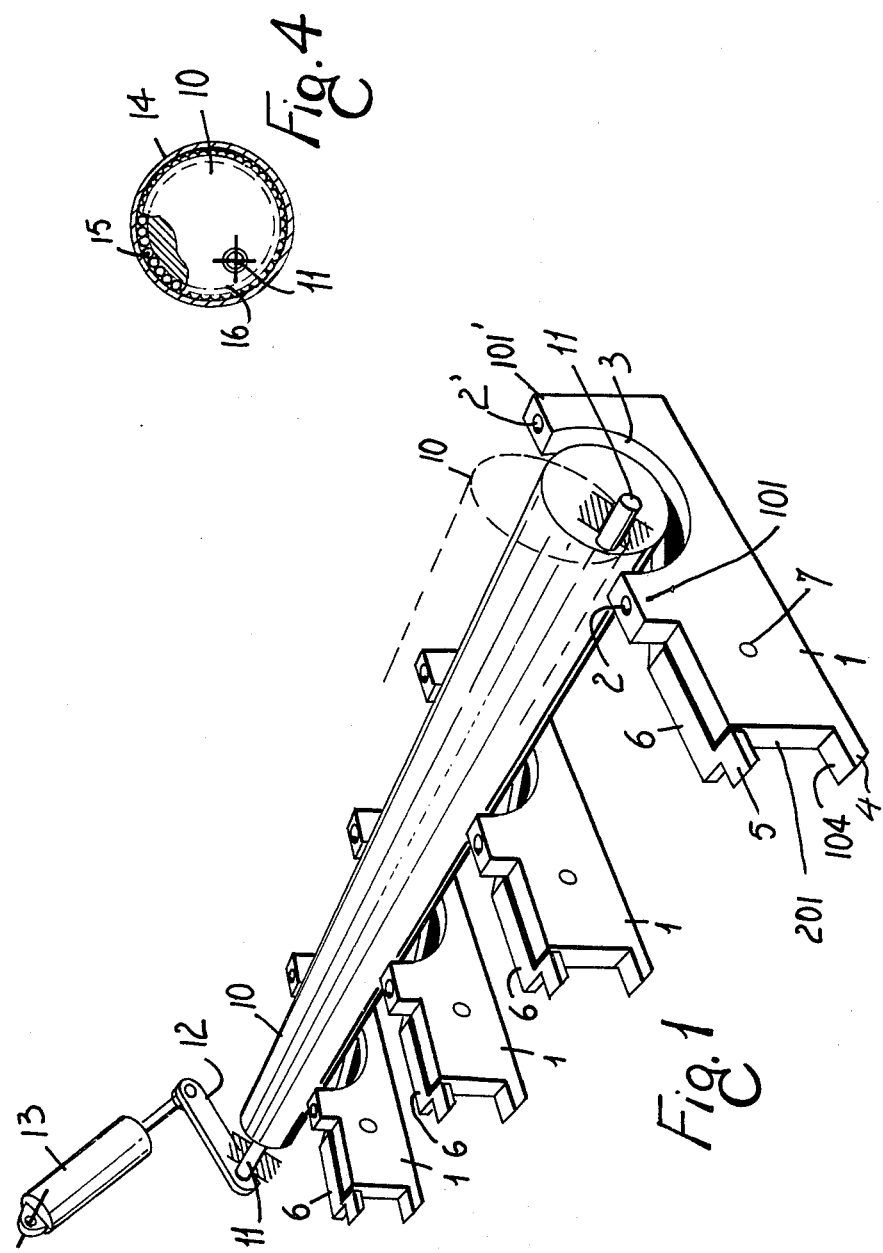

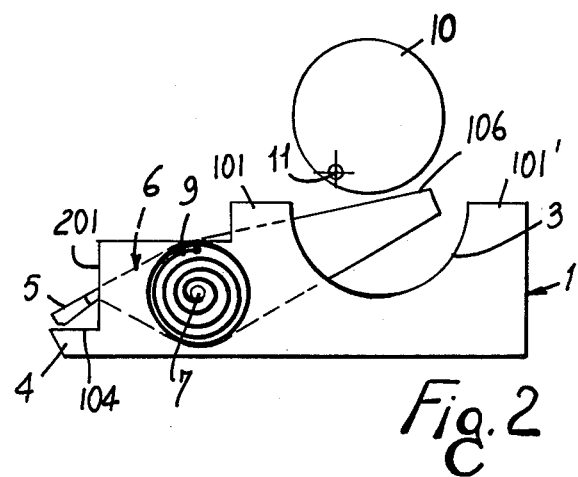
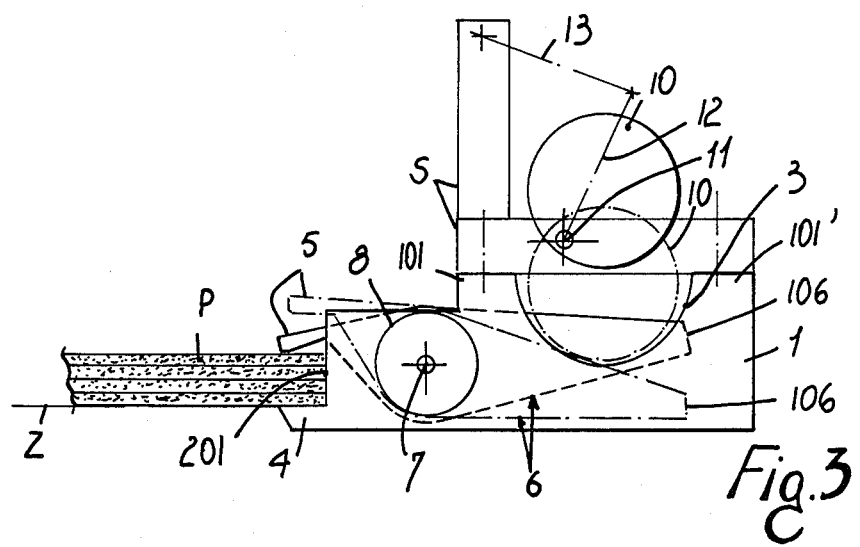

GRIPPING APPARATUS

BACKGROUND OF THE INVENTION

Machines and plants for cutting packs of panels of wood and/or other material are usually provided, upstream of each cutting line, with a carriage capable of moving both horizontally and perpendicularly to said cutting line and comprising grippers to grip the rear side of a pack, which is parallel to said line, so as to advance said pack toward the cutting station, with strokes having an extent that is pre-established by the cutting cycle to which the pack of panels is to be submitted each time.

Conventional grippers are usually provided with a respective actuating device to be opened and closed, said device comprising a fluid-operated, double acting cylinder-and-piston unit, the arrangement being such that in the closing step each gripper conforms accurately to the small differences in thickness of the gripped portions of said pack. The presence of these selective acutating devices is a complication and limitation affecting the changes in the grouping of the grippers into a given battery formation due to the different dimensions of the packs of panels to be handled, and adversely affects the manufacturing and operating costs of the panel-handling unit.

SUMMARY OF THE INVENTION

The invention aims to overcome these and other disadvantages by providing an improving gripping apparatus wherein the grippers are urged in the closing direction by respective resilient means and are urged in the opening direction by a mechanism which is coupled with a centralized drive unit. In order to change the number and mutual arrangement of the grippers, it is required only to act on the gripper, with no change or adjustment in the centralized mechanism which actuates them in the opening direction.

BRIEF DESCRIPTION OF THE DRAWINGS

The characteristics of the apparatus of the invention and the advantages resulting therefrom will become apparent from the following description of a preferred embodiment thereof, shown merely by way of example in the accompanying drawings, wherein:

FIG. 1 is a perspective view of the apparatus, with the grippers in open position;

FIGS. 2 and 3 are side elevational views of the apparatus, with the grippers in closed position in the absence and in the presence of a pack of panels, respectively; and FIG. 4 is a cross sectional view of a possible embodiment of the eccentric shaft for actuating the grippers.

DESCRIPTION OF PREFERRED EMBODIMENT

With reference to FIGS. 1 and 2, it will be noted that the grippers according to the invention each comprise a substantially rectangular lever 1 arranged edgewise and provided on the top side thereof with extensions 101,101' having holes 2,2' for securing them to the carriage transfer structure, which is shown diagrammatically by reference letter S in FIG. 3. According to a possible embodiment of the invention (not shown), said lever 1 is secured to the structure S so as to be slightly swingable about an axis which is parallel to the longitudinal axis of said structure and perpendicular to the direction of advancement of said carriage comprising said structure.

The top side of the lever 1 has, in the space between the extensions 101-101', a semi-circular recess 3 of suitable size. The front side of the lever 1 is provided with a projection 4 constituting one jaw of a gripper having a planar top face 104 which is perpendicular to the front side 201 of said lever 1. When the gripper is at rest, the top face of the jaw 4 is at the same level 12, or slightly below, the horizontal plane Z supporting the pack of panels P to be handled (FIG. 3).

Above the jaw 4 there is arranged a jaw 5 which is integral with and a projects laterally from the front end of a lever 6 which is disposed at one side of the lever 1 and is fulcrumed thereto at 7. The power arm 106 of the lever 6 is located at one side of the recess 3 of the lever 1 and the top side of said arm constitutes a chord-like element with respect to said semi-circular recess.

At the fulcrum 7, the levers 1 and 6 are provided with a box-like member 8 containing and guiding a flat coil spring 9 which is helically wound about said fulcrum 7 and is anchored at one end to the lever 1 and at the other end to the lever 6, the arrangement beiing such that under the action of said spring, said jaw 5 will be urged against the jaw 4 with a suitable force. When the gripper is in its closed condition with no panel therebetween, as shown in FIG. 2, the arm 106 of the lever 6 is located at the top of the recess 3.

A plurality of grippers of the type described above may be arranged side by side, with the same orientation, co-planar with each other and spaced apart as required, so as to constitute a battery formation which is capable of operating on the panels or packs of panels to be processed by the cutting plant or machine. According to the invention, the structure S rotatably supports, above the recesses 3 of the levers 1 of the grippers, a shaft 10 having a round section and a suitable diameter. Said shaft 10 is supported at least at its ends and parallelly to the working side of said grippers. The shaft 10 is eccentrically journalled on the structure S as indicated at 11. Secured to at least one end of the rotational journal 11 there is a cross arm 12 connected to a fluid-operated double-acting cylinder-and-piston unit 13 which is fixed to the frame of the structure S. When the unit 13 is expanded, the shaft 10 is rotated and, consequently, is moved downwards to reach the lower portion of the recesses 3, as shown in dash-and-dot lines in FIG. 3. During this step, the shaft 10 interferes with the power arm 106 of the lever 6 of each gripper and causes the upper jaw 5 to move upwards to the maximum extent to open said grippers, against the action of the spring 9. In this maximum opening condition, the grippers are moved to abut against a pack of panels P so as to contact the rear side thereof with the front side 201 of the levers 1. When the grippers have been positioned on the pack, the unit 13 is retracted so that the shaft 10 is rotated and, consequently, is moved upwards to the maximum extent, as shown in solid lines in FIG. 3. Under the action of the spring 9, the lever 6 of the gripper is moved to its closed condition and forces the jaw 5 to clamp the top side of the pack P, in opposed relation to the lower jaw 4 which, by reaction, will firmly clamp the pack P, if it is not doing so already and if, as stated above, the lever 1 is secured to the structure S so as to be slightly swingable.

The action of the spring 9 is such as to ensure firm clamping of the pack P between the jaws 4 and 5 regardless of the thickness of the pack, thus permitting correct and orderly handling of said pack, whether the grippers operate by pushing or by pulling. It is apparent that the grippers can conform individually to any difference in thickness at the clamped areas of the pack P. The economical construction of the apparatus is eivdent since all the grippers are actuated by a single control member, and it is apparent as well that, in order to change the number and mutual arrangement of the grippers, the operator will attend only to the grippers and no modification is required to the actuating mechanism of the eccentric shaft 10.

In order to avoid any sliding friction between the shaft 10 and the levers 6 of the grippers, the solution shown in FIG. 4 has been devised. The shaft 10 may be surrounded with sufficient clearance, by a co-axial tube 14 which is rotatably supported by said shaft 10 with the interposition of roller or ball bearings 15 accommodated in suitable annular raceways in said shaft 10. By this arrangement, the tube 14 may act upon the levers 6 with no sliding friction because the relative movement occurs between said tube and the shaft 10 therein, and this relative movement is of the rolling type due to the presence of the members 15.

Levers 1 and 6 be urged in the closing direction by resilient means other than those illustrated and/or having a different arrangement. The drive unit for rotating the shaft 10 may be in the form of a step-down motor, and the shaft 10 may be rotated either with a reciprocatory movement or with an intermittent unidirectional movement. According to another modification, the shaft 10 may have a smaller diameter and may be supported by means capable of raising and lowering it with either a vertical rectilinear or a curved movement, in a manner which may be easily conceived by those skilled in the art.

In the description, the constructional details of the structure S and the means containing and supporting the spring 9 have been omitted, since they are well known and may be easily conceived by those skilled in the art.

I claim:

1. A gripping apparatus comprising a plurality of grippers arranged side by side horizontally in battery formation, particularly adapted to be associated with the carriage structure (S) of a panel cutting machine, wherein
   (a) each gripper comprises a lever (1) fixed to said carriage structure (S) and a pivotable lever (6);
   (b) said levers being pivotably interconnected at a common fulcrum (7) so that said pivotable lever (6) is pivotable relative to said fixed lever (1) along a vertical plane;
   (c) each of said levers (1, 6) comprising a jaw (4, 5) cooperating with the jaw of the other lever to grip a side of a panel or pack of panels (P) therebetween in a closed gripping condition of the gripper;
   (d) elastic means (9) being provided to urge relative movement of said levers (1, 6) into said closed gripping condition, opening and closing of said jaws of all the grippers being controlled by the movement of a single control member (10) acting simultaneously on a power arm (106) of a lever (6) of each of the grippers of said apparatus, to promote relative separating movement in the vertical direction of said jaws (4, 5) against the action of said elastic means;
   (e) said single control member consisting of a horizontal shaft (10) supported by said carriage structure;
   (f) means being provided for raising and lowering said shaft so as to act on each of said power arms of said grippers;
   (g) said shaft (10) being suported rotatably and with suitable eccentricity (11) by said carriage structure (S) and the raising and lowering means (13) to promote rotation of said shaft about an eccentric axis.

2. Apparatus according to claim 1, wherein the lever secured to said carriage structure (S) is a lower lever (1) while the lever acted upon by said single control member (10) is an upper lever (6).

3. Apparatus according to claim 1, comprising a flat coil spring (9) helically wound about said fulcrum (7) and anchored by its ends to said levers, thereby urging said levers into closed, gripping position.

4. Apparatus according to claim 1, comprising an outer tube (14) mounted coaxially with said shaft (10) with the interposition of bearing means (15) to enable free rotation of said outer tube (14) on said shaft (10).

* * * * *